(12) United States Patent
Blake et al.

(10) Patent No.: US 9,459,998 B2
(45) Date of Patent: Oct. 4, 2016

(54) OPERATIONS INTERLOCK UNDER DYNAMIC RELOCATION OF STORAGE

(71) Applicant: International Business Machines Corporation, Armonk, NY (US)

(72) Inventors: Michael A. Blake, Wappingers Falls, NY (US); Garrett M. Drapala, Cary, NC (US); James F. Driftmyer, Endwell, NY (US); Deanna P. Berger, Hyde Park, NY (US); Pak-kin Mak, Poughkeepsie, NY (US); Timothy J. Slegel, Staatsburg, NY (US); Rebecca S. Wisniewski, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 78 days.

(21) Appl. No.: 14/613,800

(22) Filed: Feb. 4, 2015

(65) Prior Publication Data

US 2016/0224463 A1    Aug. 4, 2016

(51) Int. Cl.
*G06F 12/08* (2016.01)
*G06F 12/02* (2006.01)

(52) U.S. Cl.
CPC ........... *G06F 12/02* (2013.01); *G06F 12/0811* (2013.01); *G06F 12/0848* (2013.01); *G06F 12/0884* (2013.01); *G06F 2212/282* (2013.01); *G06F 2212/283* (2013.01)

(58) Field of Classification Search
CPC ...... G06F 12/00; G06F 12/08; G06F 12/084; G06F 12/0811
USPC ................................ 711/100, 118, 120, 154
See application file for complete search history.

(56) References Cited

U.S. PATENT DOCUMENTS

| 5,317,704 | A | 5/1994 | Izawa et al. |
| 5,835,961 | A * | 11/1998 | Harvey ................. G06F 12/109 711/206 |
| 6,308,248 | B1 * | 10/2001 | Welker ................ G06F 12/0292 711/153 |
| 8,285,915 | B2 | 10/2012 | Jacobs et al. |
| 8,429,346 | B1 | 4/2013 | Chen et al. |
| 8,443,163 | B1 | 5/2013 | Bailey et al. |
| 8,468,289 | B2 | 6/2013 | Hepkin et al. |
| 8,959,442 | B2 * | 2/2015 | Chilimbi ............... G06F 11/323 715/764 |
| 2003/0177325 | A1 | 9/2003 | Jann et al. |
| 2004/0019774 | A1 * | 1/2004 | Fuchikami .......... G06F 11/3624 712/244 |
| 2011/0102258 | A1 * | 5/2011 | Underbrink ............. G01S 19/37 342/357.47 |
| 2013/0227236 | A1 | 8/2013 | Flynn et al. |

OTHER PUBLICATIONS

Ancajas et al., "DMR3D: Dynamic Memory Relocation in 3D Multicore Systems", DAC '13, May 29-Jun. 7 2013, Austin, TX, USA, Copyright 2013 ACM.

* cited by examiner

*Primary Examiner* — Tuan Thai
(74) *Attorney, Agent, or Firm* — Fusheng Xu; Stephen R. Yoder (57) ABSTRACT

A multi-boundary address protection range is provided to prevent key operations from interfering with a data move performed by a dynamic memory relocation (DMR) move operation. Any key operation address that is within the move boundary address range gets rejected back to the hypervisor. Further, logic exists across a set of parallel slices to synchronize the DMR move operation as it crosses a protected boundary address range.

20 Claims, 10 Drawing Sheets

OPERATIONS INTERLOCK UNDER DYNAMIC RELOCATION OF STORAGE

BACKGROUND

The present invention relates to dynamic relocation of storage and, more particularly, to interlocking operations under dynamic relocation of storage in an address-sliced cache subsystem.

In certain computing systems and architectures, main memory is a primary resource that hypervisors manage on behalf of logical partitions, or guest operating systems. Similar to compute resources, main memory is limited in size and the main memory needs of a logical partition or operating system may change over time. To better utilize the shared memory resources of a computer system, advanced hypervisors and computer systems support dynamic (i.e., while a partition is active) allocation and de-allocation of storage in fixed size increments. The hypervisors are formed of low-level machine code that runs on processors to manage allocations of logical partitions in terms of dispatching logical processors associated with the partitions as well as the allocation of memory to the logical partitions.

While the means to move logical partitions between different physical compute resources exists, main memory cannot be relocated between physical partitions (also referred to as nodes or drawers) for an active logical partition without first disrupting the partition. Typically, a disruption can mean either suspending the partition or the entire system while performing the relocation. Thus, since main memory associated with an active logical partition cannot be moved non-disruptively, optimal resource allocation over time is not obtained and in fact memory resource allocation may become suboptimal over time as compute and memory resource demands change.

In shared cache designs which support high number of operations from a large number of processors, caches are often sliced by some system address index bits to maintain adequate throughput. These address-based cache slices, or cache pipes, are usually assigned on consecutive cache line addresses and perform cache-related operations autonomously as coherency management across the caches and memory can be performed on the cache line size basis.

Certain systems feature storage access protection keys to limit the access scope of a main program or user from beyond its assigned storage address space. The operation system within the logical partition manages the allocation and de-allocation of the pages across the programs or users in its partition, clearing and assigning a new key each time a page is de-allocated and allocated. In addition, the page change status bit is associated with the access protection key so as to indicate if a paging action between system and I/O storage is needed on a page de-allocation.

In certain systems, when a processor accesses a unit of data from storage, it is returned 2 pieces of information: a 256 bytes of storage data (cache line) where the requested unit of data is located, and a key value associated with the page in which the cache line was fetched from. The returned key is then checked against the key assigned to the program or user to determine if the access is in violation or is permitted before continuing with program execution. With systems supporting up to multiple terabytes of system memory, the amount of keys needed can be up to gigabytes of capacity, beyond the capacity of the processor caches. Therefore in certain systems, it is appropriate to have the keys physically located in a reserved region of the system memory where the page data resides and is accessed in conjunction with the data.

SUMMARY

According to an aspect of the present invention, there is a method, computer program product and/or system for interlocking operations under dynamic memory relocation in an address-sliced cache system that performs the following steps (not necessarily in the following order): (i) initializing a dynamic memory relocation (DMR) move operation in a plurality of parallel slices of the address-sliced cache system; (ii) generating a relocatable storage segment address range and an associated function for the DMR move operation; (iii) partitioning the relocatable storage segment into a contiguous series of boundary address ranges; (iv) creating a DMR reject mechanism that operates on a designated slice of the plurality of parallel slices; (v) comparing a first key address of a first key operation with a move address of the DMR move operation; and (vi) responsive to the first key address being outside of a first boundary address range of the contiguous series of boundary address ranges, performing the DMR move operation while interlocking the first key operation. The DMR move operation operates within the first boundary address range in the plurality of parallel slices.

DETAILED DESCRIPTION

As will be described below, a mechanism is provided to dynamically relocate storage increments from one physical partition to another, in order to enable defragmentation and physical affinity optimization of active logical partitions in a shared memory computer with multi-level caches. The mechanism provides for interlocks of different levels of a multi-level shared-cache memory subsystem during the dynamic relocation of backing storage and prevents unnecessary speculative prefetching, and allows for determinations to be made as to whether a chip is on the old or new memory target node without the knowledge of exactly how many lines in the target storage increment have been moved.

For example, consider a case of logical partition A that is initially allocated the compute and memory resources on physical partition 0. If the compute resources are moved to another physical partition, say physical partition 1, then due to system needs it would be optimal from logical partition A's perspective, for the corresponding hypervisor to also move the associated storage from physical partition 0 to physical partition 1. Next, consider logical partition B, with compute and memory resources allocated to physical partition 2, where logical partition B requests additional storage but the nearest available storage is on physical partition 3. The hypervisor will allocate storage on physical partition 3 to fulfill the request; however, if at a later time storage becomes available on physical partition 2, it would be optimal from logical partition B's perspective to move storage from physical partition 3 to physical partition 2. The mechanism described below will allow the hypervisor to complete these actions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, or acts, or carry out combinations of special purpose hardware and computer instructions.

Figure 1:
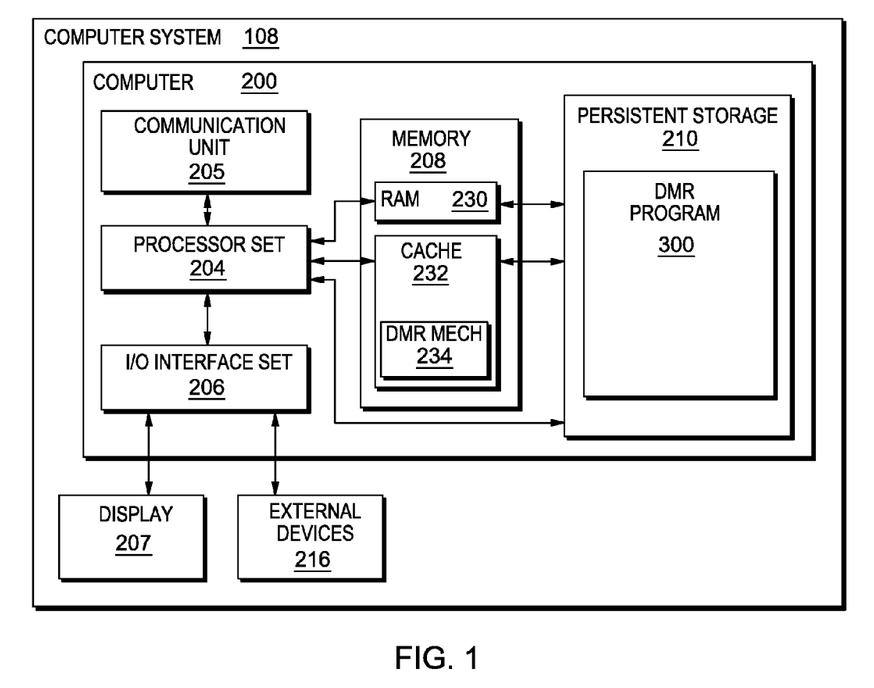
FIG. 1 is a block diagram view of a first embodiment of a system according to the present invention.

The present invention will now be described in detail with reference to the Figures. FIG. 1 is a functional block diagram illustrating various portions of computer system 108, in accordance with one embodiment of the present invention, including: computer 200; communication unit 205; processor set 204; input/output (I/O) interface set 206; memory device 208; persistent storage device 210; display device 207; external device set 216; random access memory (RAM) devices 230; cache memory device 232; dynamic memory relocation (DMR) mechanism(s) 234; and DMR program 300.

System 108 may be a laptop computer, tablet computer, netbook computer, personal computer (PC), a desktop computer, a personal digital assistant (PDA), a smart phone, or any programmable electronic device. Program 300 is a collection of machine readable instructions and/or data that is used to create, manage, and control certain software functions that will be discussed in detail below.

System 108 is shown as a block diagram with many double arrows. These double arrows (no separate reference numerals) represent a communications fabric, which provides communications between various components of system 108. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 and persistent storage 210 can include any suitable volatile or non-volatile computer readable storage media. It is further noted that, now and/or in the near future: (i) external device(s) 216 may be able to supply, some or all, memory for system 108; and/or (ii) devices external to system 108 may be able to provide memory for system 108.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 205, in these examples, provides for communications with other data processing systems or devices external to system 108. In these examples, communications unit 205 includes one or more network interface cards. Communications unit 205 may provide communications through the use of either, or both, physical and wireless communications links. Any software modules discussed herein may be downloaded to a persistent storage device (such as persistent storage device 210) through a communications unit (such as communications unit 205).

I/O interface set 206 allows for input and output of data with other devices that may be connected locally in data communication with server computer 200. For example, I/O interface set 206 provides a connection to external device set 216. External device set 216 will typically include devices such as a keyboard, keypad, a touch screen, and/or some other suitable input device. External device set 216 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 207.

Display device 207 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Figure 2:
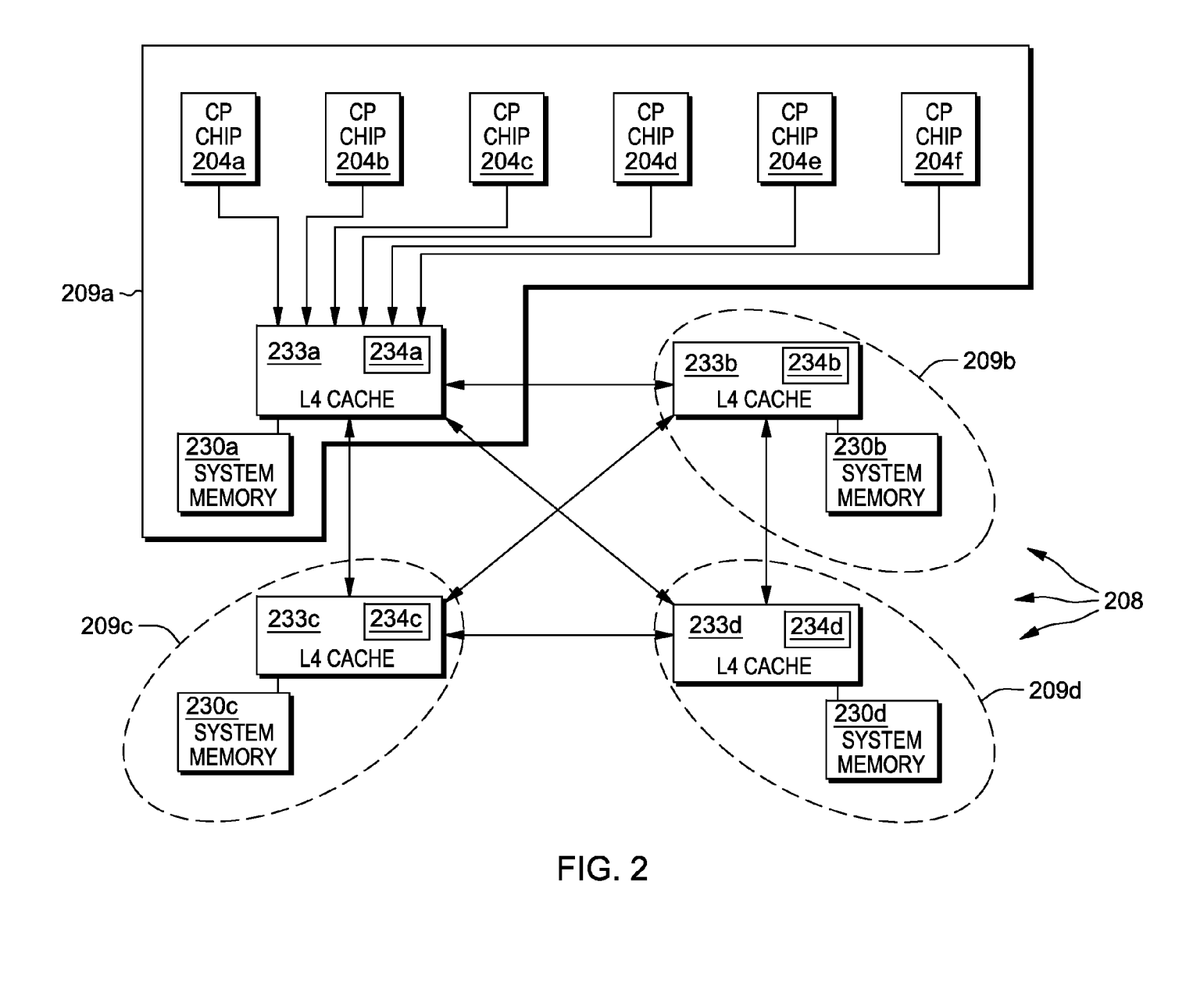
FIG. 2 is a block diagram view of a first portion of the first embodiment system.

With reference to FIG. 2, memory device 208 includes nodes 209a, 209b, 209c, and 209d that are each in communication with one another. Each of the nodes includes a portion of RAM 230 (FIG. 1) illustrated as system memory portions 230a, 230b, 230c, and 230d, which is in communication with a last level, or level four (L4), cache, such as L4 caches 233a, 233b, 233c, and 233d, which is a portion of cache 232 (FIG. 1) on the corresponding node. As shown in FIG. 2, the memory may include, for example, four nodes 209a, 209b, 209c, and 209d, although it is understood that any number of multiple nodes may be used as well. Each node includes, or is in communication with, one or more central processing (CP) chips of processor set 204 (FIG. 1), such as CP chips 204a, 204b, 204c, 204d, 204e, 204f. Because the nodes are similar to each other, only node 209a is depicted in FIG. 2 in complete detail. However, it will be understood that the other nodes are similarly configured with respect to node 209a and, for ease of illustration, only the portions of system memory and the L4 caches are shown in conjunction with nodes 209b, 209c, and 209d.

Figure 3:
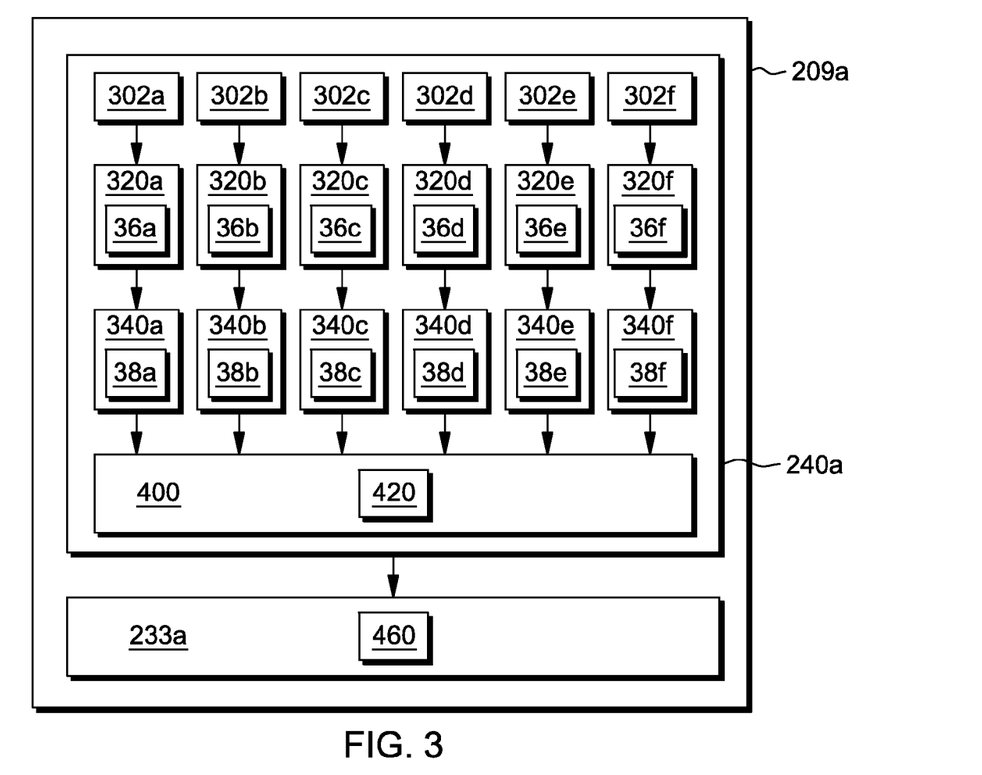
FIG. 3 is a block diagram view of a second portion of the first embodiment system.

Referring now to FIGS. 2 and 3, each CP chip, such as CP chip 204a, includes one or more cores for the reading and executing of instructions. For example, and, in the embodiment shown in FIG. 3, CP chip 204a includes six cores 302a, 302b, 302c, 302d, 302e, and 302f. It should be understood that any number of cores may be used. Each core is operatively coupled to a level one (L1) cache, such as L1 caches 320a, 320b, 320c, 320d, 320e, and 320f, and a level two (L2) cache, such as L2 caches 340a, 340b, 340c, 340d, 340e, and 340f. For example, core 302a is operatively coupled to L1 cache 320a and to L2 cache 340a. Specifically, the L1 caches are coupled to the cores, and the L2 caches are coupled to the L1 caches. The L1 cache includes an L1 controller, such as L1 controllers 36a, 36b, 36c, 36d, 36e, and 36f, and the L2 cache includes an L2 controller, such as controllers 38a, 38b, 38c, 38d, 38e, and 38f. Each L2 cache is operatively coupled to a level three (L3) cache, such that one L3 cache is included in each CP chip. Each L3 cache is shared by multiple L2 caches. For example, and, in the embodiment as shown in FIG. 3, L3 cache 400 is shared by six L2 caches 340a, 340b, 340c, 340d, 340e, and 340f. The L3 cache also includes L3 controller 420. Each level four (L4) cache 233 (e.g., 233a) is shared by one or more L3 caches. In this example, L4 cache 233a is shared by L3 cache 400. Each L4 cache includes an L4 cache controller, such as L4 controller 460. In the embodiment as shown, node 209a is in communication with six CP chips for communication with six L3 caches, such as L3 cache 400, which are in communication with L4 cache 233a.

In accordance with some embodiments of the present invention, the L1 caches may be 1 MB, the L2 caches may be 1 MB, the L3 caches may be 48 MB, and the L4 caches may be of various sizes (e.g., 256 MB, 384 MB, 512 MB and/or 1 GB). It should be understood that other cache sizes may be used as well. It should also be understood that although FIGS. 2 and 3 illustrate a multi-level cache hierarchy having four levels of cache, memory device 208 (FIG. 1) may include any number of cache levels. It should also be understood that while FIGS. 2 and 3 illustrate the highest, or last, level cache on the nodes as L4 caches, the highest level cache on the nodes may be a lower, or higher, cache level (for example, an L3 cache may be the highest level cache). Moreover, each node may be configured with a different highest level cache such that one node has an L4 cache as its highest level cache and another node has an L3 cache as its highest level cache.

Figure 4:
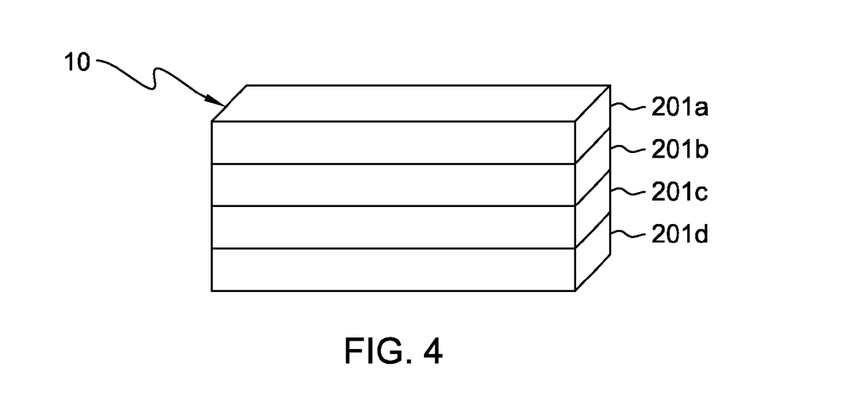
FIG. 4 is a perspective view of a third portion of the first embodiment system.

With reference to FIGS. 3 and 4, system 108, described above, may be configured for an enterprise computing system or a server (herein referred to as system 10) where the above-mentioned nodes are provided as sub-dividable server levels, or drawers, 201a, 201b, 201c, and 201d. For example, node 209a may be provided as drawer 201a.

Figure 5:
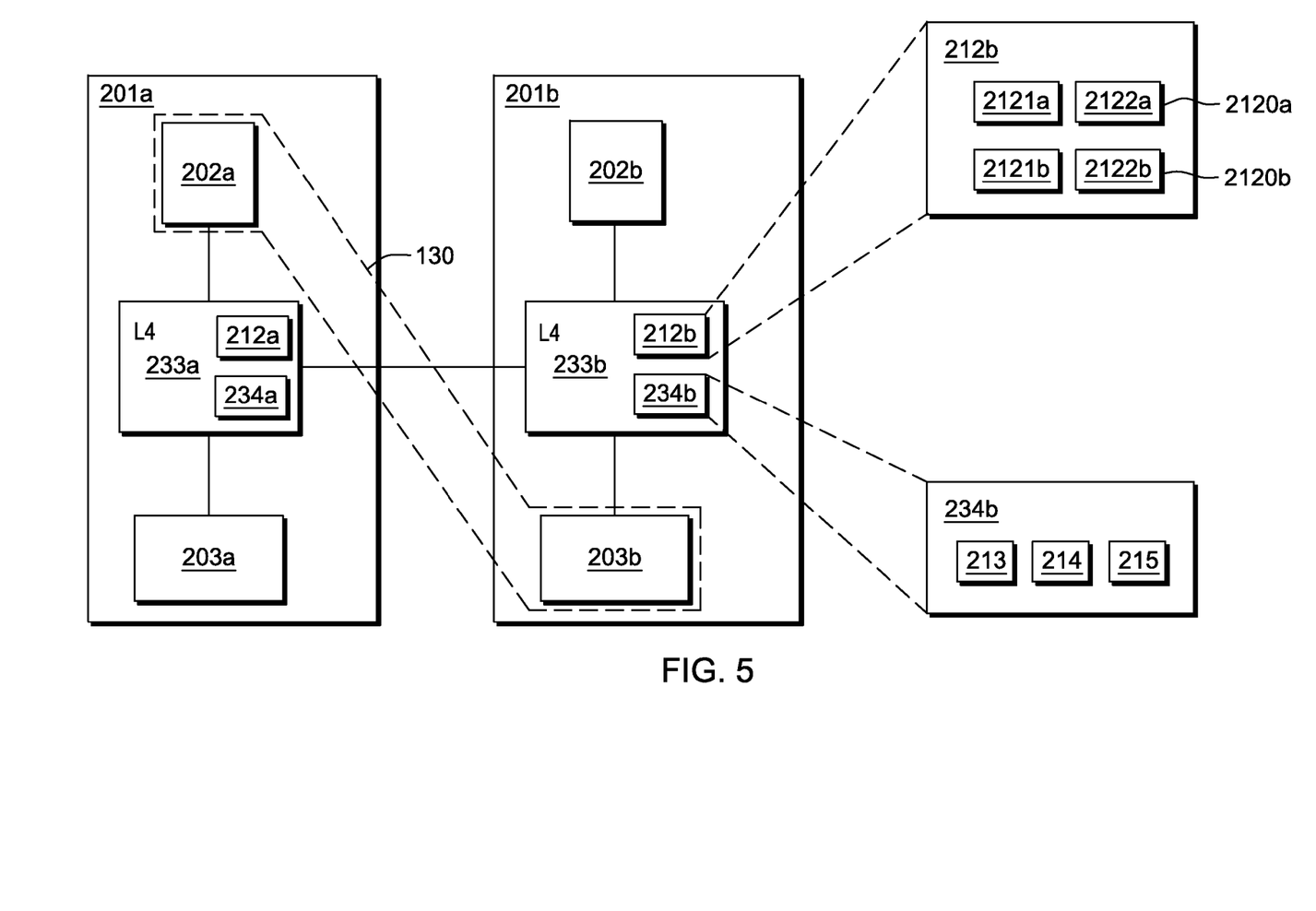
FIG. 5 is a block diagram view of a first multi-level cache subsystem of the first embodiment system.

As shown in FIG. 5, first drawer 201a may include at least first resources 202a and second resources 203a, where the first resources are compute resources, such as a CP chip, and the second resources are memory resources, such as a portion of system memory. Similarly, second drawer 201b may include at least first resources 202b and second resources 203b where the first resources are compute resources, such as a CP chip, and the second resources are memory resources, such as a portion of system memory.

In accordance with some embodiments of the present invention, it should be understood that because the first and the second resources are provided as components of the first drawer, the first resources of the first drawer are closer to, and have greater affinity with, the second resources of the first drawer than the second resources of the second drawer. By contrast, because the first and the second resources are provided as components of the second drawer, the first resources of the second drawer are closer to, and have greater affinity with, the second resources of the second drawer than the second resources of the first drawer. Accordingly, in order to maintain optimal performance levels of memory 208 (FIG. 1), a logical partition to which first resources 202a are assigned should have second resources 203a also assigned thereto, whereas a logical partition to which first resources 202b are assigned should have second resources 203b also assigned thereto. This is not always the case, however, due to allocations, de-allocations, and re-allocations of resources over time.

With further reference to FIG. 5, and in accordance with some embodiments of the present invention, memory 208 may be virtualized to include logical partition 130 to which at least first resources 202a and second resources 203b are at least initially allocated. With this or other conditions in effect, one or more of the L4 caches may be configured to perform DMR spanning of at least drawers 201a and 201b. In such a case, the hypervisor manages allocations of at least the first and the second resources of drawer 201a and the first and second resources of drawer 201b. The hypervisor configures dynamic memory relocation (DMR) mechanism(s) 234 to resolve these situations. For example, DMRs 234a and 234b may be configured to move data stored on second resources 203b (the source memory resources) to second resources 203a (the target memory resources) without interrupting the processing of the data by logical partition 130 with first resources 202a.

The DMR mechanism 234 performs DMR to enable processor resources and system memory affinity to enhance system performance and to mitigate scaling issues with computing devices of increasing complexity. While memory affinity maintenance can be difficult due to constant dynamic allocation/de-allocation of system resources results in available memory for a new partition to not always be located within the same drawer as its compute resources, DMR transparently re-groups memory into the same drawer as the compute resources. Traditional methods such as suspending the logical partition or the system for relocation generally operate at around 242 MB per second, 14.2 GB per minute, or 1 TB in 1.2 hours, the DMR mechanism operates at around 2 GB per second, 120 GB per minute, or 1 TB in 8.5 minutes. Given that the memory may have up to around 3-6 TB of memory capacity per drawer, the performance capability of DMR exceeds that of traditional methods.

The data to be moved by the DMR mechanism 234 is broken down into cache lines, for example 256 bytes each, and the source memory location of each cache line (the physical location of each cache line in the second resources) can be identified by its initial or "old" physical address. As shown in FIG. 5, DMR mechanism 234b includes: lookaside entry 213; incrementer 215; and pointer 214. Configuration table 212 (212a or 212b) may contain up to 128,000 entries or more, which are each disposed in a predefined sequence within the configuration table. In this example, in configuration table 212b, each entry 2120a, 2120b includes a corresponding absolute storage increment address 2121a, 2121*b*. The absolute storage increment address is an address block of, for example 512 MB that is assigned by the hypervisor to the logical partition, such as partition 130. Further, in this example each entry 2120*a*, 2120*b* includes a corresponding physical storage increment address 2122*a*, 2122*b*. The corresponding physical storage increment address is the "old" physical address. To summarize, each entry 2120*a*, 2120*b* in configuration table 212*b* associates the absolute address of the data to be moved with the address identifying the actual storage location of the data. Lookaside entry 213 complements the configuration table and associates the absolute address of the data to be moved with a "new" physical address identifying a target storage location of the data, for example, on second resources 203*a*.

In accordance with some embodiments of the present invention, the hypervisor configures DMR mechanism 234 to generate configuration table 212 and lookaside entry 213 at the instance of DMR initialization. This action is described in greater detail below.

Once the DMR mechanism is initialized, in this example, one particular DMR mechanism, for example 234*b*, moves one cache line at a time starting from the beginning of the absolute address of the storage increment. In doing so, DMR mechanism 234*b* prevents access to the one cache line being moved by logical partition 130, or by any other logical partition. In accordance with some embodiments of the present invention, the DMR mechanism prevents access by generating pointer 214 and incrementer 215. The pointer points to the cache line that is currently being moved, in the illustration the pointer is pointing to cache line 2120*a*. Since each discrete movement includes a fetch operation and a write operation, the pointer continues pointing to the cache line until both the fetch operation and the write operation are complete. When the operations are complete, the incrementer moves the pointer on each drawer in memory 208 to the next sequential cache line.

Access to the data to be moved by the logical partition 130 or by another entity (e.g., additional logical partitions and hypervisors of other physical partitions) can continue on a general basis by first determining the actual physical location of each cache line. This is accomplished by reviewing the relative position of the cache line in question to the pointer position in the configuration table. If a particular cache line is associated with an entry that is already passed by the pointer, the indication is that the cache line has been moved and the actual physical location of the cache line can be found from the lookaside entry. By contrast, if a particular cache line is associated with an entry that has not yet been passed by the pointer, the indication is that the cache line has not yet been moved and the actual physical location of the cache line can be found from the configuration table. If the particular cache line is associated with a sequential entry that is currently pointed to by the pointer 214, the cache line is in the process of being moved and access will be blocked for the duration of the cache line move (the time required to complete the fetch and write operations of the cache line). Because the logical partition has continual access to the cache lines within the storage increment being moved, the DMR is substantially transparent to the logical partition.

Figure 6:
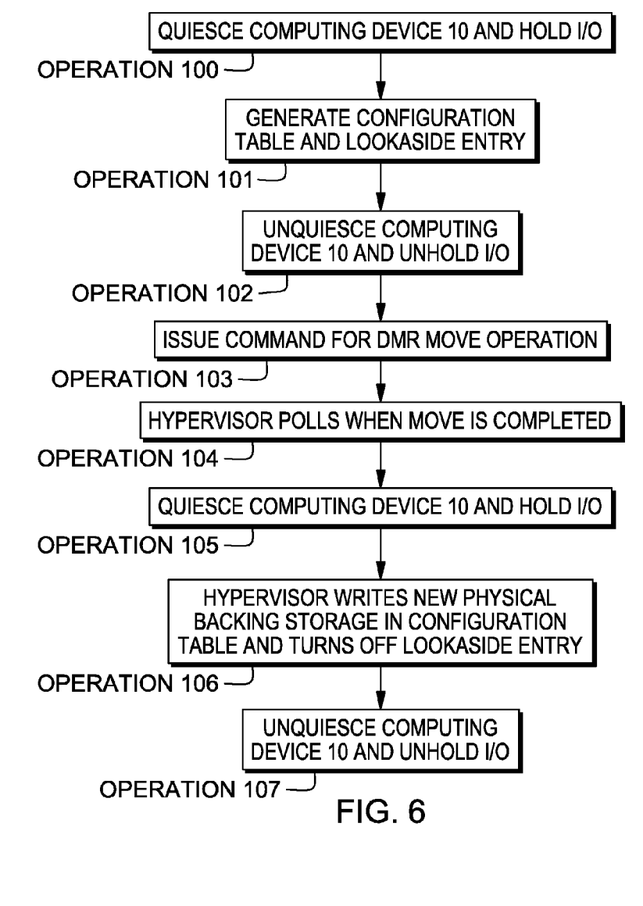
FIG. 6 is a flow chart view of a first embodiment method performed, at least in part, by the first embodiment system.

With reference now to FIG. 6, a method of operating memory 208, described, above will now be presented. Initially, when the hypervisor determines that DMR is needed, the compute resources are quiesced, or rendered temporarily inactive or disabled, and all input/output (I/O) operations are held (operation 100). Configuration table 212 and lookaside entry 213 are generated. DMR mechanisms 234*a* and 234*b* are put into effect on drawers 201*a*, 201*b*, and any other associated drawers, and chip 204*a* for a move pending status to disable memory accesses to the storage increment being moved and to enable address compares to reject key conflicting operations (operation 101). At this point, the compute resources are unquiesced and the I/O operations are unheld (operation 102) such that a DMR move operation command for the storage increment can be issued (operation 103). During such a DMR move operation, hardware DMR line fetch and store operations use the same system address and the DMR mechanisms maintain the pointer of the lookaside entry.

As the process continues, the hypervisor polls a DMR mechanism, 234*a* or 234*b*, when the move is completed on all pipes (operation 104) and the compute resources are quiesced with the I/O operations held again (operation 105). The hypervisor then writes new physical backing storage in configuration table 212 and turns off lookaside entry 213 (operation 106) and the compute resources unquiesced with the I/O operations unheld (operation 107).

Figure 7:
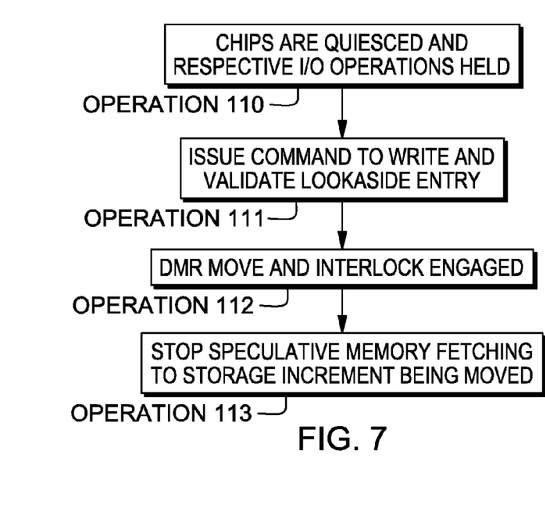
FIG. 7 is a flow chart view of a second embodiment method performed, at least in part, by the first embodiment system.

With reference to FIG. 7, a process of setting up lookaside entry 213 will now be described. Initially, the chips 204*a*, 204*b*, 204*c*, 204*d*, 204*e*, and 204*f* are quiesced and their respective I/O operations are held (operation 110). Then, the hypervisor issues a command to write and validate the lookaside entry throughout the system so that two physical addresses are associated with the moving storage increment (the source memory resources and the target memory resources) for all DMR mechanisms 234, with pointer 214 identifying whether a cache line is to be found at its source memory location or its target memory location (operation 111). The DMR move is now pending on all drawers, so a DMR move and interlock are engaged (operation 112).

With the DMR move and the interlock engaged in operation 112, speculative memory fetching by chip 204*a* to the storage increment being moved is stopped (operation 113). That is, local speculative memory fetches are skipped on a lookaside entry hit with the pointer maintained in the DMR mechanism and the DMR mechanism becoming responsible for fetches on a lookaside entry hit. Here, DMR mechanism 234*b* will issue speculative memory fetches based on line-based compares until the DMR mechanism is no longer on the target memory drawer.

Figure 8:
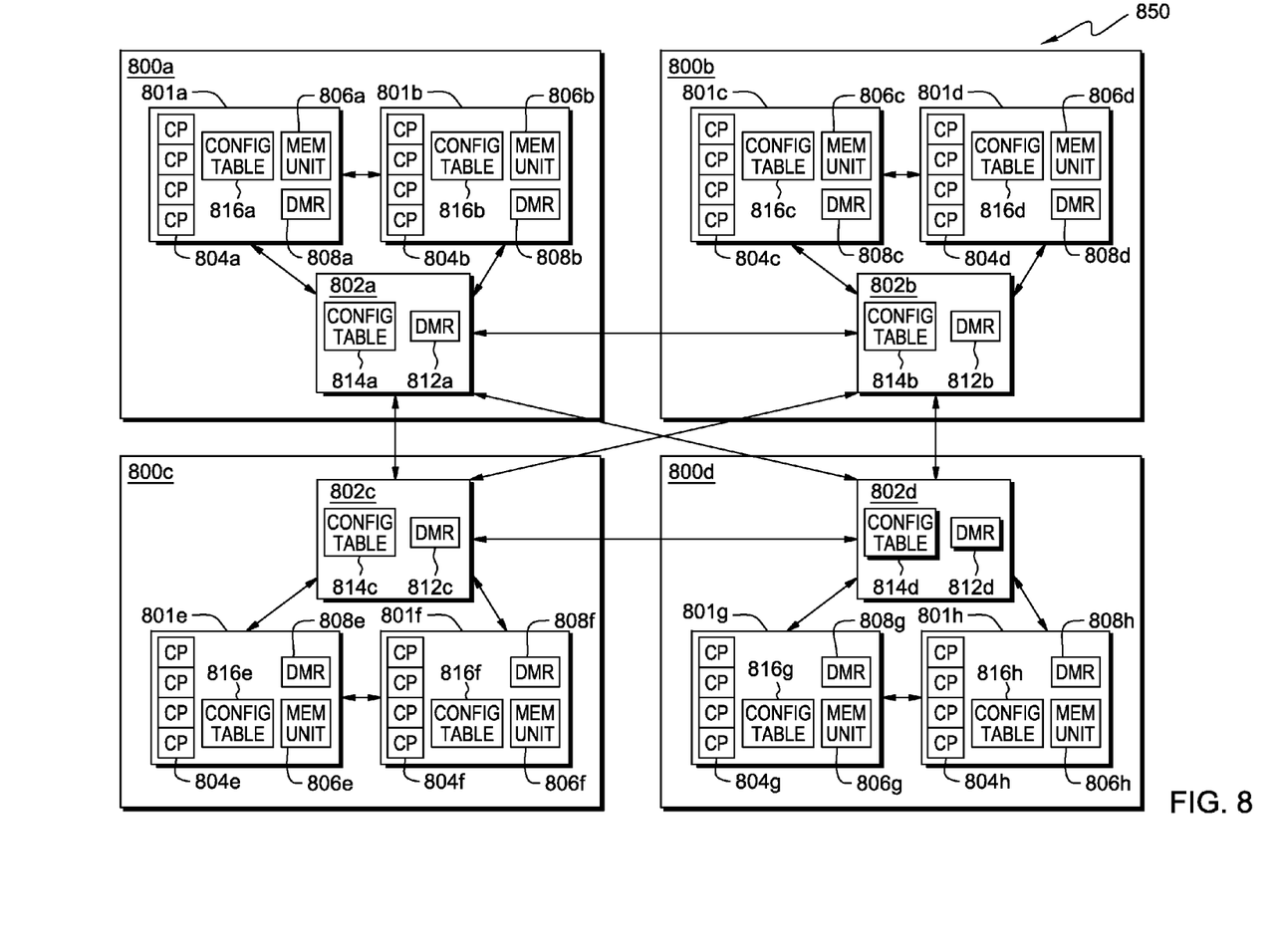
FIG. 8 is a block diagram view of a second embodiment of a system according to the present invention.

In greater detail with reference to FIG. 8 and, in accordance with some embodiments of the present invention, memory device 850 includes: a plurality of nodes 800*a*, 800*b*, 800*c*, 800*d* and each node includes multiple chips 801*a*, 801*b*, 801*c*, 801*d*, 801*e*, 801*f*, 801*g*, and 801*h*, and a corresponding node controller 802*a*, 802*b*, 802*c*, 802*d* at which the multiple chips are assignable to logical partitions. Each of the multiple chips comprises corresponding processor sets 804*a*, 804*b*, 804*c*, 804*d*, 804*e*, 804*f*, 804*g*, and 804*h*, and corresponding memory units 806*a*, 806*b*, 806*c*, 806*d*, 806*e*, 806*f*, 806*g*, and 806*h* that is configured to handle local memory operations originating from the processors. Each of the multiple chips further includes a corresponding chip-level DMR mechanism 808*a*, 808*b*, 808*c*, 808*d*, 808*e*, 808*f*, 808*g*, and 808*h* and a corresponding chip-level configuration table 810*a*, 810*b*, 810*c*, 810*d*, 810*e*, 810*f*, 810*g*, and 810*h*. Each node controller includes a corresponding node-level DMR mechanism 812*a*, 812*b*, 812*c*, and 812*d* and a corresponding node-level configuration table 814*a*, 814*b*, 814*c*, and 814*d*. Each node-level DMR mechanism is configured to move data having a DMR storage increment address relative to a local one of the memory units without interrupting the processing of the data by at least one of the logical partitions. As will be explained below, during movement of the data by the node-level DMR mechanism, the memory units are disabled from handling local memory operations matching the DMR storage increment address, while the node-level DMR mechanism of the node controller handles the local memory operations matching the DMR storage increment address.

With the above exemplary configuration, chip-level configuration tables 816a, 816b, 816c, 816d, 816e, 816f, 816g, and 816h are present on each of the multiple chips and node-level configuration tables 814a, 814b, 814c, and 814d are present on their respective node controller 802a, 802b, 802c, and 802d. Each of the chip-level configuration tables and the node-level configuration tables include the same absolute address to physical address mapping. Part of that physical address contains node and chip identifier information for the physical memory location. In addition, while node-level DMR mechanism 812a is substantially similar to the DMR mechanism 234a, described above, chip-level DMR mechanisms, such as DMR mechanism 808a, include the capability to review lookaside entry registers and include a comparator to compare memory fetches and stores against DMR relocation addresses. These chip-level DMR mechanisms may not include the pointer/incrementer functionality described above. Thus, the chip-level hardware does not know which cache line is currently being moved or how much of the DMR storage increment has/has not been moved. That is, the chip-level hardware only knows that a storage increment is being moved and must rely on the node controller to handle all memory fetch and store operations that originate from within the local node.

It should be understood that there are three primary reasons why the chip-level hardware would not be the same as the node-level hardware. The first reason is that the node controllers communicate with each other on all coherent operations when requests cannot be satisfied by a cache within a node. By having the node controllers drive DMR sequences, much of the existing hardware necessary to relocate storage increments is being re-used, which is to say that the protection of the cache line being relocated is, for the most part, based on the same protection that already exists to handle the situation where multiple processors are requesting access to the same data. The second reason is that extending DMR pointer functionality and information down to the chip level slows down DMR processing time as there is an extra step needed for the node controller to send pointer values to memory units. The third reason is that keeping DMR pointer/incrementer functionality at the node level is a simpler and more efficient design from the hardware perspective.

Typically, for memory fetch operations originating from the processors residing within the node (same processor chip as well as direct-attached processor chips), the corresponding memory unit looks up its copy of the chip-level configuration table to determine the node and chip identifier from the physical address associated with the absolute address of the fetch request. If the node and chip identifier points to itself, the memory unit does an immediate memory prefetch operation in parallel to the fetch request being broadcast out by the local node controller to any peer node controllers to determine if the fetch request exists in other nodes. The term "prefetch" implies an early fetch to memory before the system wide cache hit/miss status is known. If there is a hit, the cached data is returned to the processor and the prefetched memory data is dropped. If there is no hit, the data from the prefetch is returned to the processor. Normally, the local node controller does not do any memory prefetches on behalf of fetch requests originating from the processors within its node. However, the node controller, in this type of system, is responsible for forwarding memory fetch requests from other nodes if the target node and chip identifier (from the associated storage increment address in the node-level configuration table 814, e.g., 814a) points to a local memory unit.

In DMR mode, the behavior described above is modified. When the request address targets the same storage increment address that is set up in lookaside entry 213 (FIG. 5), the memory units do not know the position of the pointer of the DMR move and cannot be depended on for processing the requests at the right physical memory location. Thus, all memory operations for local (same node) requests that match the DMR storage increment address (not just the cache line address) are handled by the node controller. The node controller compares the line address of the request against its DMR pointer and picks the physical address, particularly the node and chip identifier, either from the node-level configuration table or the lookaside entry to determine the actual location of the physical memory stored data based on the result of the comparison. After the DMR mechanism completes the storage increment relocation (for example, 512 MB of stored data) the memory units resume handling of local memory operations until the next DMR move.

In an address-sliced multiprocessor cache, large cache subsystems are often sliced by a low-order address bit for physical packaging reasons (e.g., to reduce bus widths and complexity of intermediate points in the cache subsystem), this complicates the design of an interlock between two operations that span all slices of the cache subsystem. In such a system, even a smallest unit of storage (for example, a page) that can be allocated by an operating system or a storage increment that is allocated by the system hypervisor, is partitioned across the slices based on some pre-determined address bit or bits selecting one or more group of cache lines.

In some embodiments of the present invention, the cache line size is 256 bytes of contiguous storage. Alternatively the cache line size is smaller or larger than 256 bytes. The number of cache pipes can vary. In some embodiments, the system includes 4 cache pipes which means that a 1 KB of contiguous storage is striped across the 4 pipes with successive contiguous 1 KB of storage blocks striped the same way. The size of a page is usually larger than a cache line size, e.g. 4 KB or 1 MB. Therefore the cache lines within the page are distributed across the 4 pipes. Specifically, since there are 16 caches lines in a 4 KB page, in some embodiments, the page is then distributed with cache lines 0, 4, 8, 12 on pipe 0, cache lines 1, 5, 9, 13 on pipe 1, cache lines 2, 6, 10, 14 on pipe 2 and cache lines 3, 7, 11, 15 on pipe 3.

To reduce the performance impact of accessing keys in memory each time a requested unit of data is serviced from the cache, a copy of the key is included in the directory tag entry associated with the cache line upon its install. When the processor performs a storage update operation on the cache line, the corresponding page change status bit in the directory tag is updated thereby potentially creating a singular copy of the current state of the page change status. As a result, operations that directly access or modify the access protection key and/or the page change status bit, or the key field, are processed at a page size coherency granule as these operations need to access or modify the key field in the reserved memory region and the caches where portions of the page may be installed.

When the slices are relocating the same data block (such as a size greater than a page), the slices can progress at different speeds due to random system loads on each slice, which can affect the performance of the relocating hardware, or DMR hardware. In a computer system, when a system level operation starts up, such as a key instruction in a system architecture, it is attempting to alter a state value associated with a system page, but it can only alter the state value if all the slices either have not started relocating the key page address or have already relocated the page.

As described, dynamic memory relocation (DMR) is a valuable function in a computer system (for example, a virtualized computer system). The computer system may also support in-hardware, page-based key instruction management and operations. Implementing support for page-based key operations along with dynamic memory relocation, while ensuring proper key operation behavior and minimizing performance/hardware impact, poses unique challenges. That is, it is challenging how to non-disruptively relocate storage from one physical memory location to another supporting operations based on cache line size and page size coherency granules in a multi-piped cache design.

Some embodiments of the present invention recognize the following facts, potential problems, and/or potential areas for improvement with respect to the current state of the art: (i) protection of a storage key from processor key operations as the storage key is moved to new memory home; (ii) coherence granularity of keys are on 4 KB instead of 256 B for a cache line size; (iii) whether a 256 B data block is either in old memory, in transit, or in new memory, 4 KB key is in-determinant; (iv) all cache lines of data need to be moved before the key is considered in new memory home; and (v) independent L4 pipes makes managing a 4 KB key move more challenging.

Some embodiments of the present invention provide a set of mechanisms to interlock key operations and a dynamic memory relocation operation, for example, in an address-sliced multiprocessor cache subsystem. Dataflow and associated control flow are organized into parallel slices such that when, as an example, a data relocation is taking place, each of the slices is simultaneously relocating data only within their own slices and never between slices.

Specifically, a method is provided to interlock the slices by having each slice pause to synchronize with each other at a predetermined address boundary (for example, 1 Megabyte) before resuming the data relocation. This ensures the slices can never be operating on different boundary regions, thereby allowing the key instruction to alter the system state value safely as long as the page address is not within some range (1 or more boundary regions) of the current address position of the relocation.

In some embodiments of the present invention, the key operation is made to wait momentarily until the DMR engine, or mechanism, has moved some address range beyond the boundary region containing the key page address.

Figure 9:
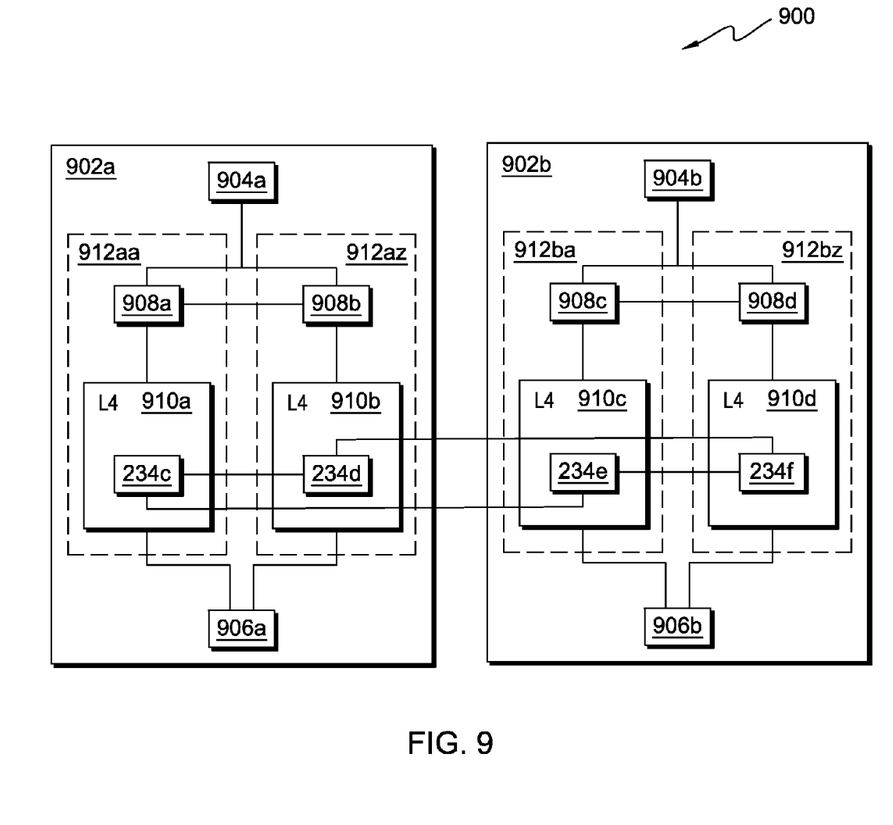
FIG. 9 is a block diagram view of a second multi-level cache subsystem of the first embodiment system.

In accordance with some embodiments of the present invention, FIG. 9 shows address-sliced cache sub-system 900. Node 902a includes, in this example, first resources 904a and second resources 906a, where the first resources are compute resources and the second resources are memory resources. Similarly, Node 902b includes first resources 904b and second resources 906b, where the first resources are compute resources and the second resources are memory resources. For ease of illustration, only L3 cache 908a, 908b, 908c, and 908d and L4 caches 910a, 910b, 910c, and 910d are shown for the multi-level cache subsystem. Further, the multi-level cache hierarchy is partitioned into a plurality of slices based on a low-order address bit. The plurality of slices are designated as slices 912aa to 912az and 912ba to 912bz, to indicate that any number of slices may be considered for each node. The L4 cache in each slice is configured to perform DMR. Each DMR mechanism 234c, 234d, 234e, and 234f in each slice 912aa to 912bz is in communication with other DMR mechanisms within a node (e.g., node 902a) and across nodes (e.g., nodes 902a and 902b).

Figure 10:
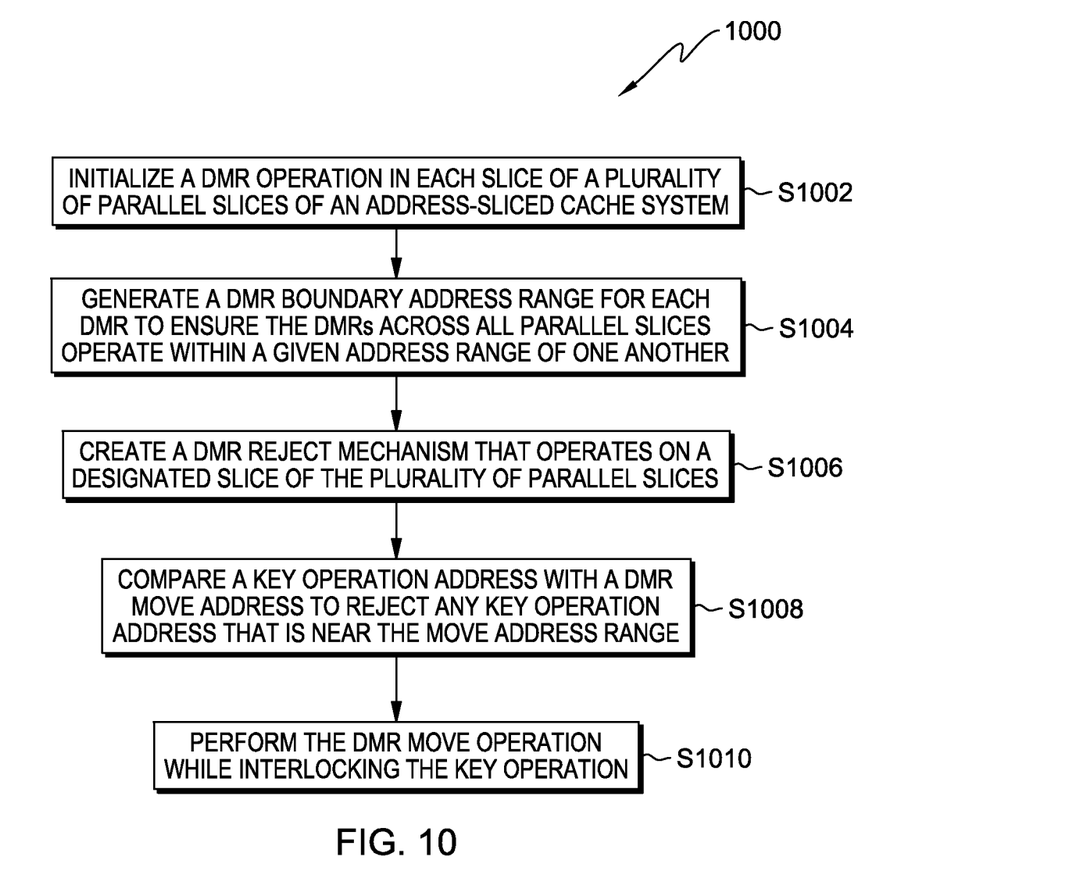
FIG. 10 is a flow chart view of a first embodiment method performed, at least in part, by the first embodiment system.
Figure 11:
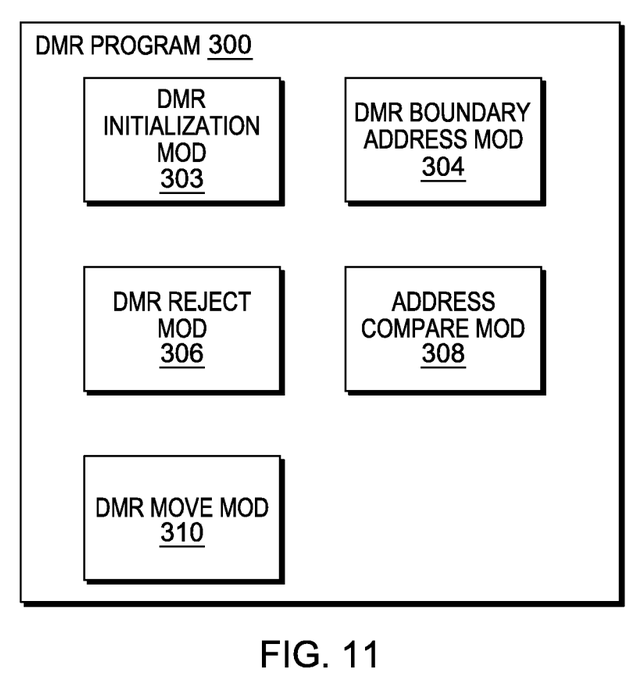
FIG. 11 is a block diagram view of a machine logic (for example, software) portion of the first embodiment system.

FIG. 10 shows flowchart 1000 depicting a method of interlocking operations under DMR in an address-sliced cache system according to the present invention. FIG. 11 shows DMR program 300 (FIG. 1) for performing at least some of the method steps of flowchart 1000. This method and associated software will now be discussed, over the course of the following paragraphs, with extensive reference to FIG. 10 (for the method step blocks) and FIG. 11 (for the software blocks).

DMR program 300 may include both machine readable and performable instructions, and/or substantive data (that is, the type of data stored in a database). DMR program 300 operates to provide multi-boundary address protection range to prevent key operations from interfering with the data move performed by DMR. Any key operation address that is near the move address range gets rejected back to the processor, such as processor set 204 (FIG. 1) to retry the operation at a later time. Further, DMR program 300 includes logic across all the L4 pipes to synchronize the move as it crosses a protection boundary range.

Processing begins at step S1002, where DMR initialization module 303 initializes an instance of DMR in each slice. The initialization of DMR includes generating a configuration table (e.g., table 212 in FIG. 5) and a lookaside entry (e.g., entry 213 in FIG. 5), quiescing the computer system on which DMRs run (e.g., processor set 204 in FIG. 1) and holding all I/O operations. At this time, a DMR move pending status is put in effect in each slice 912aa to 912bz.

Processing proceeds to step S1004, where DMR boundary address module 304 determines a DMR boundary region address range and associated function for each DMR to ensure the DMRs across all the slices are operating within a given address range of one another. The address range is defined by a boundary region size that is equal or larger than the page size, for example 1 MB in this particular embodiment. However, the boundary region size is programmable to be a smaller or larger size than 1 MB. The DMR on each slice cannot freely traverse a boundary region until all slices on the node have arrived at the end of the region. Thus, potentially conflicting key operations are prevented. In some embodiments, the boundary address range is programmable to be at the same size as, or greater than, the largest coherence granularity of the key operation in the system.

Processing proceeds to step S1006, where DMR reject module 306 creates a DMR reject mechanism that operates on one designated slice of the cache subsystem. In this example, the designated slice is slice 912aa. Slice 912aa asserts the DMR reject mechanism to block new key operations that target an address near the boundary region that is being moved from one memory portion to another.

Processing proceeds to step S1008, where address compare module 308 compares a key operation address with a DMR move address. Any key operation address that is near the move address range gets rejected back to the processor, such as processor set 204 (FIG. 1). For example, when a key operation targeting a page(s) within two continuous 1 MB boundary regions (current 1 MB range and next 1 MB range) of the DMR move is rejected. The DMR reject indication is returned back to the processor, such as processor set 204

(FIG. 1) to release hardware associated with the key operation to allow other operations an opportunity to proceed.

Further, in order to ensure proper synchronization across each slice of the address-sliced cache sub-system, logic exists to delay issue of key operations to other slices within node 902a until cleanly received by slice 912aa (for example, without a DMR reject). Further, delaying the issue of key operations to other slices operates to ensure common selection of key operation for processing across all slices of the cache system.

Processing ends at step S1010, where DMR move module 310 performs the DMR move operation when the above key operation(s) is interlocked. As each DMR reaches the end of 1 MB boundary, the DMR move is paused and reports a "ready" status to slice 912aa. At this time, the line pointer, such as line pointer 214 (FIG. 5) should be pointing to the first line of the new boundary region. Slice 912aa sends a "start" command when its last line move completes and also when other pipes' "ready" status is seen. Then, each slice continues the DMR move into the next, for example, 1 MB boundary and drops the "ready" status. Further a prerequisite may be included that slice 912aa bumps the line pointer on all slices when any other slices' "ready" status is on. The key operation(s) is allowed to proceed once DMR has moved beyond the 1 MB boundary region target of the key operation.

In some embodiments of the present invention, there exists logic to handle the rare case of a DMR engine catching up to a key operation in progress. In this scenario, the DMR engine waits for the key operation on its slice to complete before proceeding. Because key operations coordinate their reset across all slices, this ensures that the DMR does not pass a key operation in progress on any slice until the key operation completes on all slices.

Figure 12:
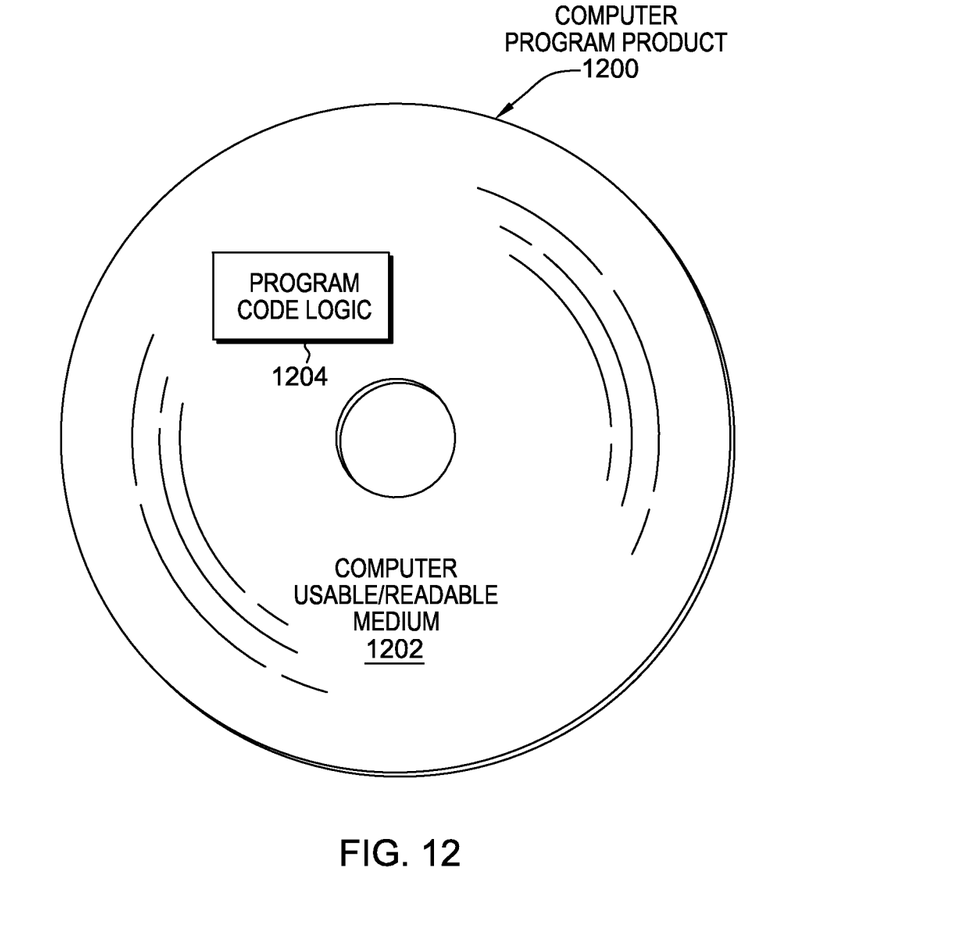
FIG. 12 illustrates a computer program product according to an embodiment of the present invention.

Referring now to FIG. 12, in one example, a computer program product 1200 includes, for instance, one or more storage media 1202, wherein the media may be tangible and/or non-transitory, to store computer readable program code means or logic 1204 thereon to provide and facilitate one or more aspects of the invention.

Some embodiments of the present invention may include one, or more, of the following features, characteristics and/or advantages: (i) meets architected system behavior for key operations even during dynamic memory relocation (DMR); (ii) does not adversely affect system performance; and (iii) requires only an incremental amount of logic in addition to existing control structures.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

What is claimed is:

1. A method for interlocking operations under dynamic memory relocation in an address-sliced cache system, comprising:
   initializing a dynamic memory relocation (DMR) move operation in a plurality of parallel slices of the address-sliced cache system;
   generating a relocatable storage segment address range and an associated function for the DMR move operation;
   partitioning the relocatable storage segment into a contiguous series of boundary address ranges;
   creating a DMR reject mechanism that operates on a designated slice of the plurality of parallel slices;
   comparing a first key address of a first key operation with a move address of the DMR move operation; and
   responsive to the first key address being outside of a first boundary address range of the contiguous series of boundary address ranges, performing the DMR move operation while interlocking the first key operation;
   wherein:
   the DMR move operation operates within the first boundary address range in the plurality of parallel slices.

2. The method of claim 1, wherein initializing a DMR move operation includes:
   generating a configuration table and a lookaside entry.

3. The method of claim 1, wherein the first boundary address range is programmable to be at a same size as, or greater than, a largest coherence granularity of the first key operation in the system.

4. The method of claim 1, further comprising:
   responsive to a second key operation targeting an operation address in the first boundary address range, the DMR reject mechanism rejecting the second key operation; wherein:
   the first boundary address range, includes the move address of the DMR move operation for data that is being moved from a first memory resource to a second memory resource.

5. The method of claim 1, further comprising delaying an issue of key operations to slices other than the designated slice until there is no DMR reject indication in order to ensure common selection of key operation for processing across all slices of the cache system.

6. The method of claim 1, further comprising:
   responsive to the DMR reject mechanism catching up to a key operation in progress, the DMR rejection mechanism waiting for the key operation on its slice to complete before proceeding.

7. The method of claim 1, wherein the key operation is allowed to proceed once the DMR has moves beyond the first boundary address range of the key operation.

8. The method of claim 1, wherein the plurality of parallel slices are synchronized before crossing into a second boundary address range of the contiguous series of boundary address ranges.

9. The method of claim 1, wherein the address-sliced cache system organizes a data flow and a corresponding control flow into the plurality of parallel slices.

10. A computer program product for interlocking operations under dynamic memory relocation in an address-sliced cache system, the computer program product comprising a non-transitory computer readable storage medium having stored thereon instructions for performing a method comprising:

initializing a dynamic memory relocation (DMR) move operation in a plurality of parallel slices of the address-sliced cache system;

generating a relocatable storage segment address range and an associated function for the DMR move operation;

partitioning the relocatable storage segment into a contiguous series of boundary address ranges;

creating a DMR reject mechanism that operates on a designated slice of the plurality of parallel slices;

comparing a key address of a key operation with a move address of the DMR move operation; and     responsive to the key address being outside of a first boundary address range of the contiguous series of boundary address ranges, performing the DMR move operation while interlocking the key operation;

wherein:

the DMR move operation operates within the first boundary address range in the plurality of parallel slices.

11. The computer program product of claim 10, wherein initializing a DMR move operation includes:

generating a configuration table and a lookaside entry.

12. The computer program product of claim 10, wherein the first boundary address range is programmable to be at a same size as, or greater than, a largest coherence granularity of the key operation in the system.

13. The computer program product of claim 10, wherein the method further comprises:

responsive to a second key operation targeting an operation address in the first boundary address range, rejecting, via the DMR reject mechanism, the second key operation;

wherein:

the first boundary address range, includes the move address of the DMR move operation for data that is being moved from a first memory resource to a second memory resource.

14. The computer program product of claim 10, wherein the method further comprises:

delaying an issue of key operations to slices other than the designated slice until there is no DMR reject indication in order to ensure common selection of key operation for processing across all slices of the cache system.

15. The computer program product of claim 10, wherein the method further comprises:

responsive to the DMR reject mechanism catching up to a key operation in progress, holding the DMR reject mechanism for the key operation on its slice to complete before proceeding.

16. A computer system for interlocking operations under dynamic memory relocation in an address-sliced cache system, the computer system comprising:

a processor(s) set; and a non-transitory computer readable storage medium;

wherein:

the processor set is structured, located, connected, and/or programmed to run program instructions stored on the non-transitory computer readable storage medium; and     the program instructions for performing a method comprising:

initializing a dynamic memory relocation (DMR) move operation in a plurality of parallel slices of the address-sliced cache system;

generating a relocatable storage segment address range and an associated function for the DMR move operation;

partitioning the relocatable storage segment into a contiguous series of boundary address ranges;

creating a DMR reject mechanism that operates on a designated slice of the plurality of parallel slices;

comparing a key address of a key operation with a move address of the DMR move operation; and     responsive to the key address being outside of a first boundary address range of the contiguous series of boundary address ranges, performing the DMR move operation while interlocking the key operation;

wherein:

the DMR move operation operates within the first boundary address range in the plurality of parallel slices.

17. The computer system of claim 16, wherein initializing a DMR move operation includes:

generating a configuration table and a lookaside entry.

18. The computer system of claim 16, wherein the first boundary address range is programmable to be at a same size as, or greater than, a largest coherence granularity of the key operation in the system.

19. The computer system of claim 16, wherein the method further comprises:

responsive to a second key operation targeting an operation address in the first boundary address range, rejecting, via the DMR reject mechanism, the second key operation;

wherein:

the first boundary address range, includes the move address of the DMR move operation for data that is being moved from a first memory resource to a second memory resource.

20. The computer system of claim 16, wherein the method further comprises:

responsive to the DMR reject mechanism catching up to a key operation in progress, holding the DMR reject mechanism for the key operation on its slice to complete before proceeding.

\* \* \* \* \*